(12) United States Patent
Katada

(10) Patent No.: US 7,295,834 B2
(45) Date of Patent: Nov. 13, 2007

(54) TELEPHONE NUMBER DISPLAY METHOD AND SET

(75) Inventor: Nobuyuki Katada, Tokyo (JP)

(73) Assignee: NEC Corporation, Tokyo (JP)

( * ) Notice: Subject to any disclaimer, the term of this patent is extended or adjusted under 35 U.S.C. 154(b) by 422 days.

(21) Appl. No.: 09/808,380

(22) Filed: Mar. 14, 2001

(65) Prior Publication Data

US 2001/0027124 A1 Oct. 4, 2001

(30) Foreign Application Priority Data

Mar. 28, 2000 (JP) ............................. 2000-089409

(51) Int. Cl.
*H04M 3/42* (2006.01)
(52) U.S. Cl. .................... 455/415; 455/566; 455/550.1
(58) Field of Classification Search ............ 455/550.1, 455/566, 415, 528; 379/112.01, 457, 88.11, 379/356
See application file for complete search history.

(56) References Cited

U.S. PATENT DOCUMENTS 6,125,287 A * 9/2000 Cushman et al. ........... 455/566
6,278,886 B1 * 8/2001 Hwang ....................... 455/566
6,320,943 B1 * 11/2001 Borland .................. 379/112.01
6,408,191 B1 * 6/2002 Blanchard et al. .......... 455/566
2002/0128033 A1 * 9/2002 Burgess ...................... 455/528

FOREIGN PATENT DOCUMENTS

| GB | 2 344 727 A | 6/2000 |
| JP | S62-023265 | 1/1987 |
| JP | H06-224990 | 8/1994 |
| JP | H11-119348 | 4/1999 |
| JP | H11-163999 | 6/1999 |
| JP | H11-259458 | 9/1999 |

* cited by examiner

*Primary Examiner*—Joseph Feild
*Assistant Examiner*—Phuoc H Doan
(74) *Attorney, Agent, or Firm*—Scully, Scott, Murphy & Presser, P.C.

(57) ABSTRACT

A telephone number display method for a portable telephone is disclosed, in which desired data can be readily found out from data extracted by retrieval of telephone numbers registered as telephone number diary data. In a portable telephone set, in which telephone number diary data such as names of persons and telephone numbers are preliminarily registered, the registered data are retrieved by such method as a group retrieval method and a kana affixing retrieval method, and registered names and telephone numbers of the retrieved data are displayed in a predetermined sequence of display together with the total number of cases of each data piece of the extracted telephone number diary data and the serial number of the data in display in the display sequence.

6 Claims, 5 Drawing Sheets

NUMBER OF CALL TRANSMITTING AND ARRIVAL TIMES

0

2

15

1

7

TELEPHONE NUMBER DISPLAY METHOD AND SET

BACKGROUND OF THE INVENTION

This application claims benefit of Japanese Patent Application No. 11-089409 filed on Mar. 28, 2000, the contents of which are incorporated by the reference.

The present invention relates to telephone number display methods for portable telephone sets and, more particularly, to a method of displaying such data as telephone numbers and names preliminarily stored in a memory provided in a portable telephone set on a display thereof.

Data extraction by retrieval of a plurality of telephone numbers registered in a prior art portable telephone set will now be described. A portable telephone set user may extract a desired telephone number in a number of telephone numbers registered in the set by retrieval according to any one of the following five different retrieval methods.

In a first method, registered names and corresponding telephone numbers are displayed in the Japanese 50-kana sequence on a display by scrolling them in a predetermined key operation. In a second method, names and corresponding telephone numbers are displayed by scrolling them in a registered memory number sequence. In this case, the data may be displayed from data of memory number 1 or from data of memory number 50 by using a jump function. In a third method, some portions of preliminarily registered sets of affixing kanas are inputted, then names corresponding to the sets affixing kanas including the inputted affixing kanas are retrieved, and names of extracted cases and corresponding telephone numbers are displayed. A fourth method is used for a portable telephone set, in which telephone numbers can be registered in a plurality of groups. In this method, when a particular group is selected, names registered in that group are displayed together with corresponding telephone numbers by scrolling them in the Japanese 50-kana sequence. In a fifth method, some portions of preliminarily registered telephone numbers are inputted, and only telephone numbers including the inputted telephone number portions are extracted and displayed together with corresponding names.

In either of the above cases, what are displayed are names and telephone numbers. Where the data are registered in independent groups, group names and drawings each corresponding to each group are also displayed. In the case of retrieving data with the memory numbers, names, telephone numbers and memory numbers are displayed.

However, in the above prior art portable telephone set the total number of cases extracted by the retrieval is not displayed. That is, the user can not recognize the total number of cases extracted by the retrieval. In addition, the user can not designate the sequence of display.

Furthermore, the user cannot recognize the sequential number of the case being displayed when he or she is searching a desired case by scrolling the cases extracted by the retrieval. Moreover, by making continual scroll after all the cases have been displayed the first displayed case is restored. Therefore, it is impossible for the user to recognize whether all the cases have been retrieved.

SUMMARY OF THE INVENTION

An object of the present invention is therefore to provide a retrieved telephone number displaying method and a portable telephone set capable of recognizing the sequence number of the data being displayed in the total number of cases, designating the sequence of display to a desired sequence and rearranging data including telephone numbers, etc., with affixed serial numbers in the sequence of greater numbers of times of utilization and affix the serial numbers to the rearranged data for the display thereof.

According to an aspect of the present invention, there is provided a retrieved telephone number displaying method for a portable telephone set for retrieving telephone numbers and other data registered in the portable telephone set and displaying the retrieved data in a display of the portable telephone set, wherein data retrieved in a predetermined sequence is displayed together with the total number of cases of the retrieved data and the predetermined sequence.

The data retrieved in the predetermined sequence is rearranged in a sequence of greater numbers of times of utilization and displayed in the sequence of greater number of times of utilization together with the total number of cases of the retrieved data and the rearranged sequence. The data retrieved in the predetermined sequence is data retrieved by a Japanese 50-kana sequence retrieval method, a kana affixing retrieval method, a group retrieval method or a telephone number inputting retrieval method.

According to another aspect of the present invention, there is provided a retrieved telephone number displaying system for a portable telephone set for retrieving telephone numbers and other data registered in the portable telephone set and displaying the retrieved data in a display of the portable telephone set, wherein data received in a predetermined sequence is displayed together with the total number of cases of the retrieved data and the predetermined sequence.

The data retrieved in the predetermined sequence is rearranged in a sequence of greater numbers of times of utilization and displayed in the sequence of greater number of times of utilization together with the total number of cases of the retrieved data and the rearranged sequence. The data retrieved in the predetermined sequence is data retrieved by a Japanese 50-kana sequence retrieval method, a kana affixing retrieval method, a group retrieval method or a telephone number inputting retrieval method.

According to other aspect of the present invention, there is provided a portable telephone set comprising a CPU, a memory for storing such data as telephone numbers and names, and a display for storing the stored data, wherein the CPU retrieves the data stored in the memory in a predetermined sequence, and displays the data retrieved in the predetermined sequence on the display of the portable telephone set together with the total number of cases of the retrieved data and the predetermined sequence.

The data retrieved in the predetermined sequence is rearranged in a sequence of greater numbers of times of utilization and displayed in the sequence of greater number of times of utilization together with the total number of cases of the retrieved data and the rearranged sequence. The data retrieved in the predetermined sequence is data retrieved by a Japanese 50-kana sequence retrieval method, a kana affixing retrieval method, a group retrieval method or a telephone number inputting retrieval method.

Other objects and features will be clarified from the following description with reference to attached drawings.

PREFERRED EMBODIMENTS OF THE INVENTION

Preferred embodiments of the present invention will now be described with reference to the drawings.

Figure 1:
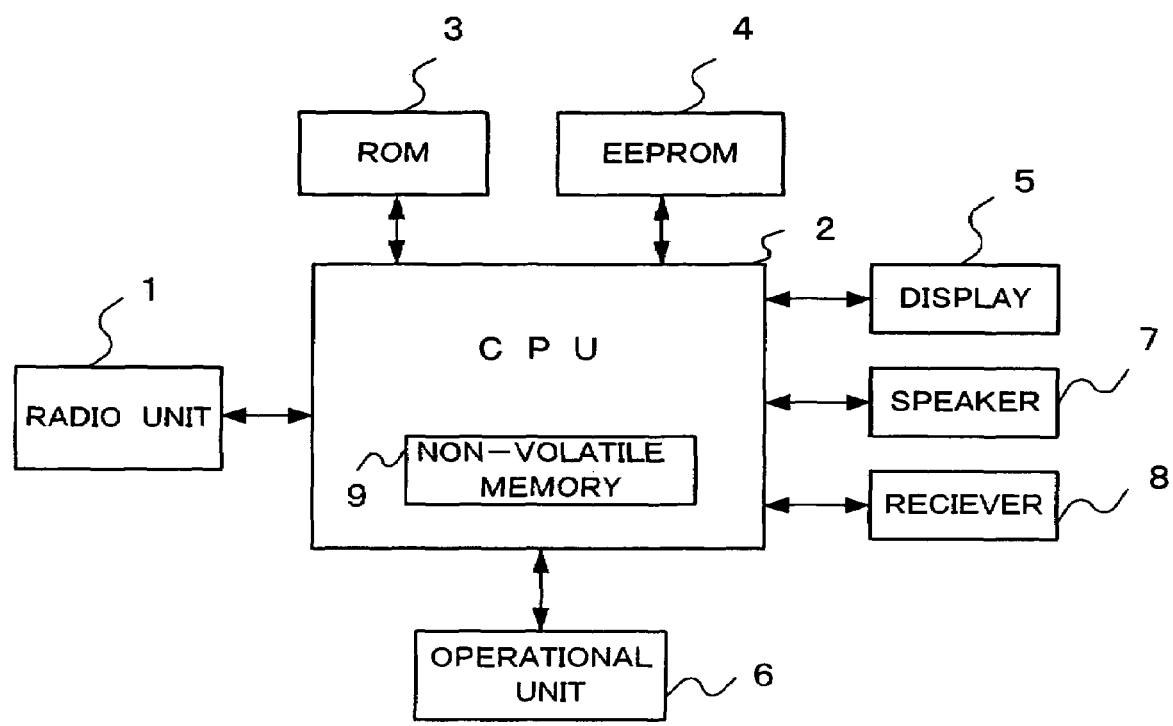
FIG. 1 is a block diagram showing a portable telephone set according to the present invention.

FIG. 1 is a block diagram showing a portable telephone set according to the present invention. As shown in FIG. 1, the portable telephone set according to the present invention comprises a radio unit 1 for transmitting and receiving data, a CPU 2 for controlling the processing of the whole system, a ROM 3 for storing programs and the like, a EEPROM 4 for storing a telephone number diary, which is formed by entering telephone numbers, names, etc. registered for a plurality of groups in correspondence to memory numbers, a display 5 such as an LCD for displaying telephone numbers, etc., an operational unit 6 as an input unit, a speaker as a voice output unit and a receiver 8 as a voice input unit. The CPU 2 includes as a non-volatile memory 9. Programs and data necessary for processing are read out from the ROM 3 and EEPROM 4 and stored in the non-volatile memory. These programs and so forth are used in the CPU 2 for processing therein.

Figure 2:
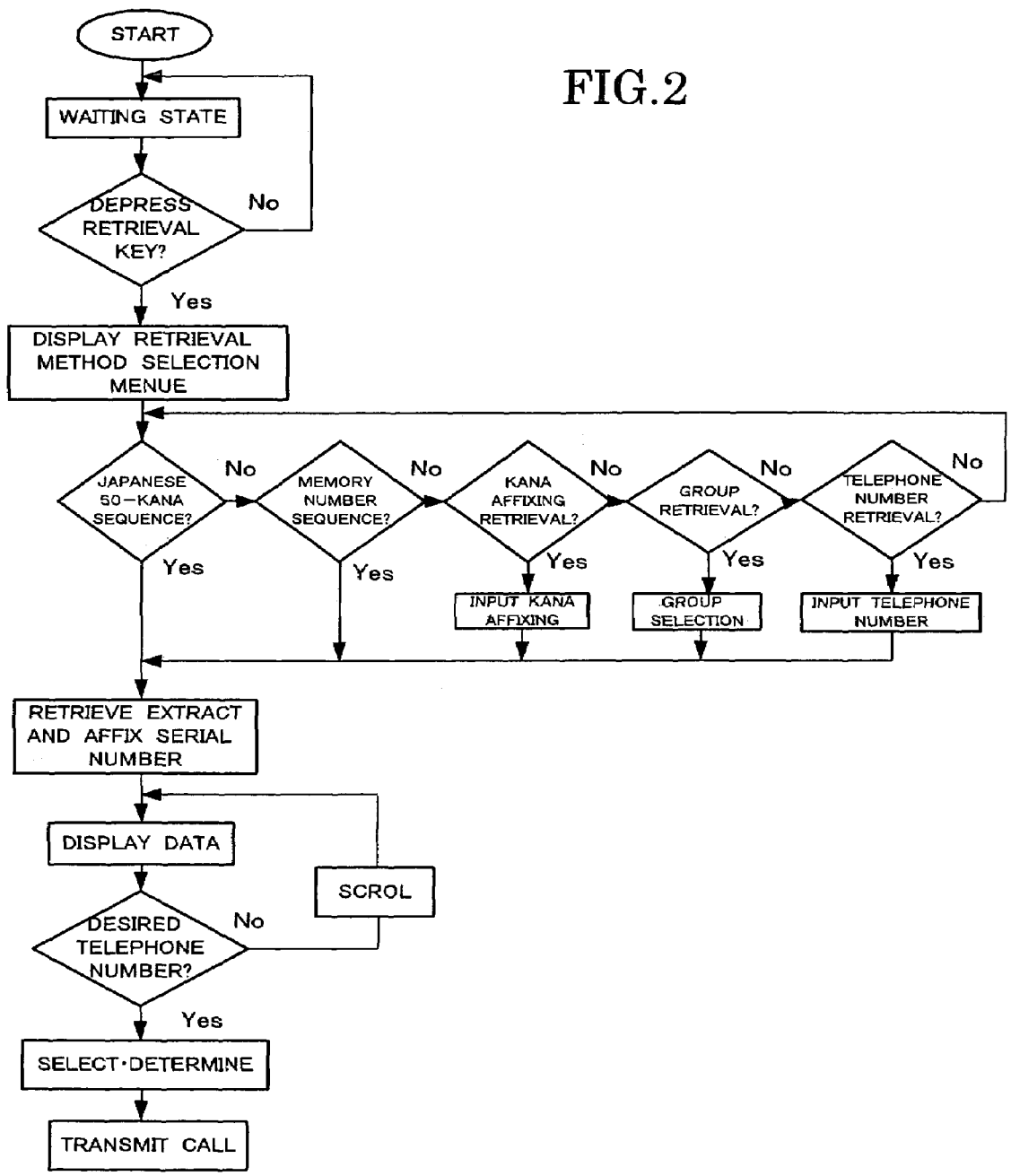
FIG. 2 is a flowchart illustrating a first embodiment of the present invention.

With the above construction, the portable telephone according to the present invention operates as follows. FIG. 2 is a flow chart illustrating a first embodiment of the present invention.

When the operating unit 6 is not operated by the user and in the absence of any processing such as brought about at the call arrival time or alarming, date, time, etc. are displayed on the display 5. This state is referred to as waiting state. In the waiting state, a retrieval method selection mode is set up by depressing a predetermined key in the operational unit 6. According to the present invention, five different retrieval modes available for selection, i.e., a Japanese 50-kana sequence retrieval method, a memory number sequence retrieval method, an kana affixing retrieval method, a group retrieval method and a telephone number inputting retrieval method. The user selects one of these five different retrieval methods by operating the operational unit 6.

When the Japanese 50-kana sequence retrieval method is selected, the CPU 2 retrieves telephone number diary data from the non-volatile memory 9 and affix a serial number to each data piece of the retrieved telephone number diary data in the Japanese 50-kana sequence. The CPU 2 then displays the total number of cases extracted by the retrieval and number 1 together with the name and the telephone number in the data piece of the telephone number diary data with affixed number 1. When the displayed telephone number is not the desired one, the user scrolls the displayed data by operating the operational unit 6, and displays the telephone number diary data with the next affixed number 2. The user repeats the above operation until the desired telephone number is displayed. When the desired telephone number is displayed, the user transmits a call by operating the operational unit 6.

When the memory number sequence retrieval method is selected, the CPU 2 retrieves the telephone number diary data from the non-volatile memory 9, and affix serial number to each data in the telephone number diary data in the memory number sequence. The CPU 2 then displays the total number of cases extracted by the retrieval and number 1 together with the name and the telephone number with affixed number 2.

When the kana affixing retrieval method is selected, it becomes possible to input kanas for affixing. The user then inputs kanas from the operational unit 6. The kanas for affixing are registered, and they are fully or partly inputted. When the kana input has been ended, the CPU 2 retrieves the telephone number diary data for data including the inputted kanas, and displays the retrieved-out data on the display unit 5. In this case, the CPU 2 affixes the serial numbers to the data in a predetermined sequence, and displays the data on the display 5 in the sequence from the data with affixed number 1.

When the group retrieval method is selected, it becomes possible to perform group selection. The user then selects one of a plurality of groups by directly inputting a group number. Alternatively, it is possible to perform the group selection by directly inputting the group number. When the group selection has been ended, the CPU 2 extracts telephone number diary data belonging to the selected group from the non-volatile memory 9. The CPU 2 then affixes a serial number to each data piece of the telephone number diary data on a predetermined sequence, and displays the data on the display 5 in the sequence from the data with affixed number 1.

When the telephone number inputting retrieval method is selected, it becomes possible to input telephone numbers by operating the operational unit 6. The telephone numbers for inputting are registered, and they are fully or partly inputted. When the telephone number inputting has been ended, the CPU 2 extracts data fully or partly including the inputted telephone numbers from the non-volatile memory 9. The CPU 2 then affixes serial numbers to the extracted data in a predetermined sequence, and displays the data on the display 5 in the sequence for the data with affixed number. 1.

The sequence of display as the result of the retrieval as described above, is the Japanese 50-kana sequence when this sequence is designated. When the designated sequence of display is a sequence from greater number of times of utilization, the display sequence is also from greater numbers of times of utilization.

Figure 3:
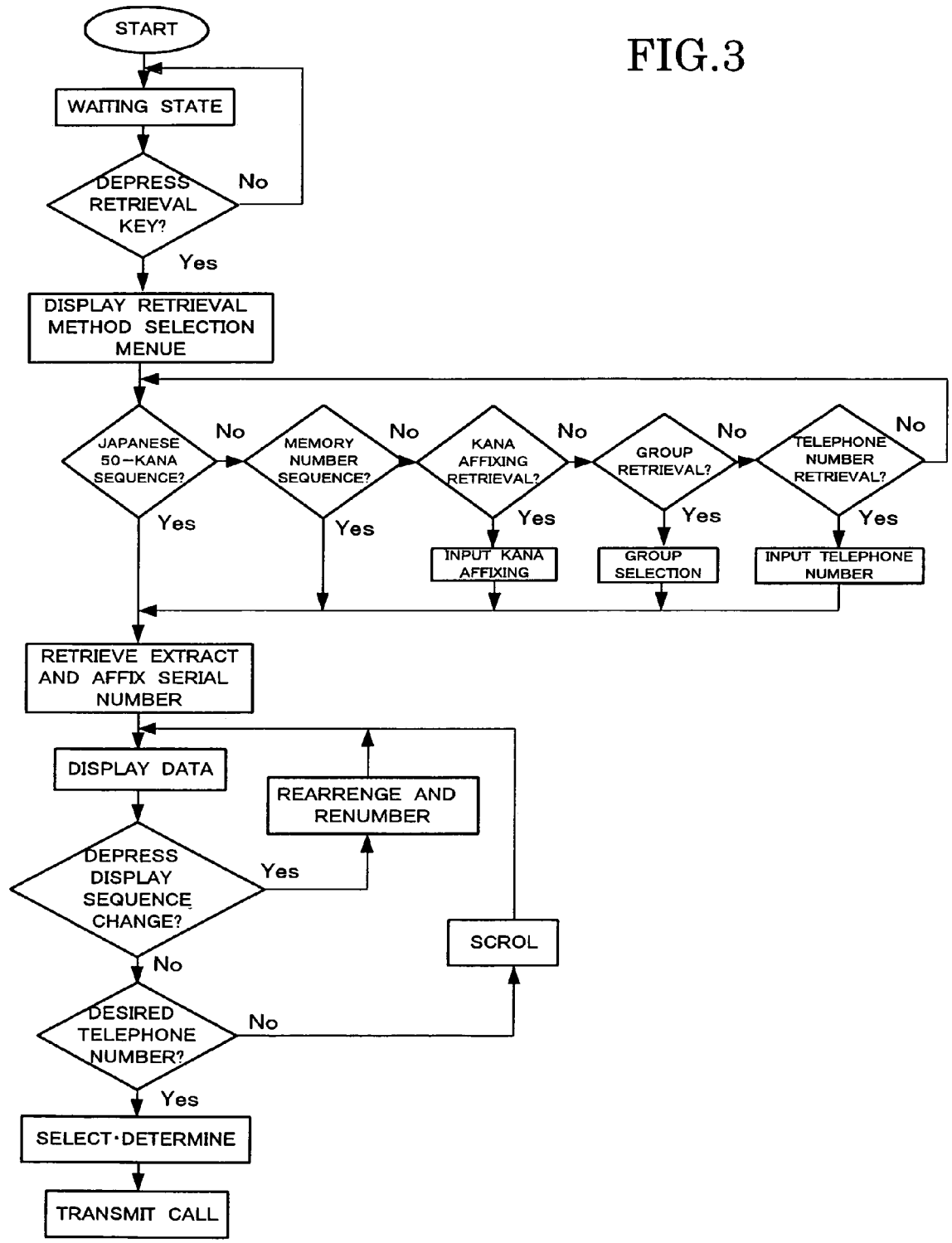
FIG. 3 is a flow chart illustrating the operation of a second embodiment of the present invention.

FIG. 3 is a flow chart illustrating the operation of a second embodiment of the present invention. The operation of the portable telephone set according to the present invention will now be described with reference to the Figure.

Referring to the Figure, the routine is the same as in FIG. 2 from the waiting state till the retrieval, extraction and serial number affixing. Its difference resides in that the CPU 2 rearranges the data in the sequence of greater numbers of call transmitting and arrival times and affixes serial numbers in this sequence for displaying the rearranged data in the sequence from the data with affixed number 1.

For example, when the Japanese 50-kana sequence is designated as the sequence of display, after the display of the data in the Japanese 50-kana sequence from the data with affixed number 1, the user operates the operational unit 6 to cause the CPU 2 to rearrange the data in the sequence of greater numbers of call transmission and arrival times and affixes serial numbers in this sequence of rearrangement for displaying the data in the sequence from the data with affixed number 1.

When the sequence of greater numbers of call transmission and arrival times is designated as the sequence of display, the user operates the operational unit 6 to cause the CPU 2 to rearrange the data in the Japanese 50-kana sequence and affixes serial numbers in this sequence for displaying the rearranged data in the sequence from the data with affixed number 1.

Figure 4:
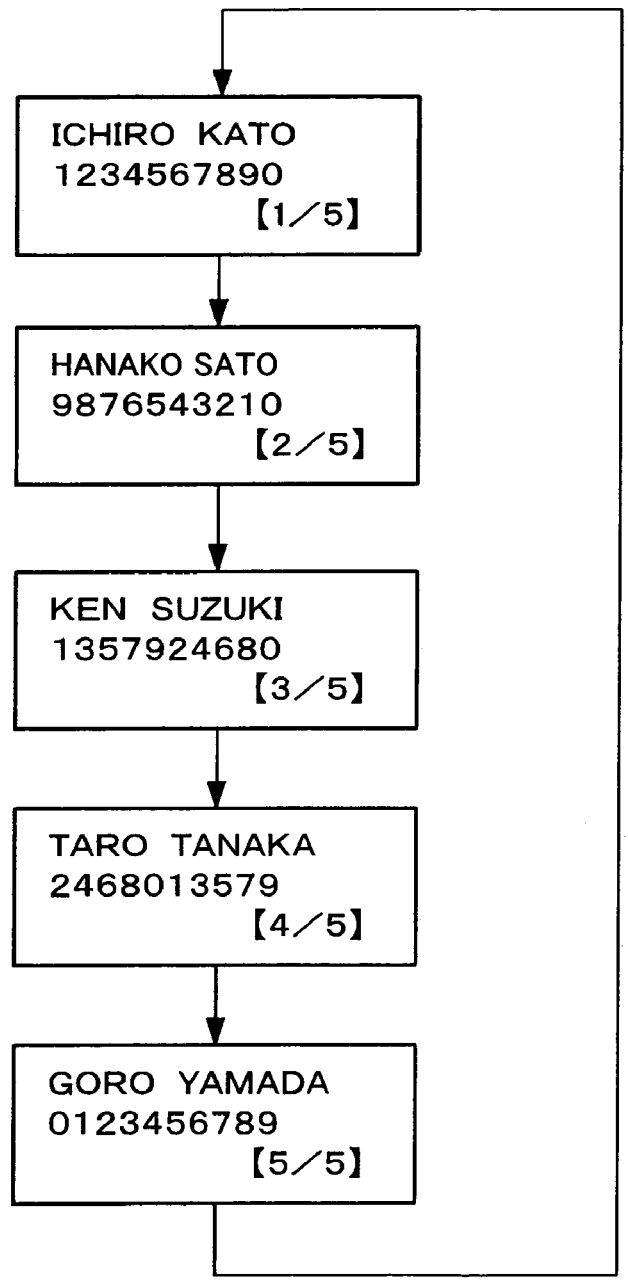
FIGS. 4 and 5 show examples of data contents displayed on the display 5 after the retrieval.
Figure 5:
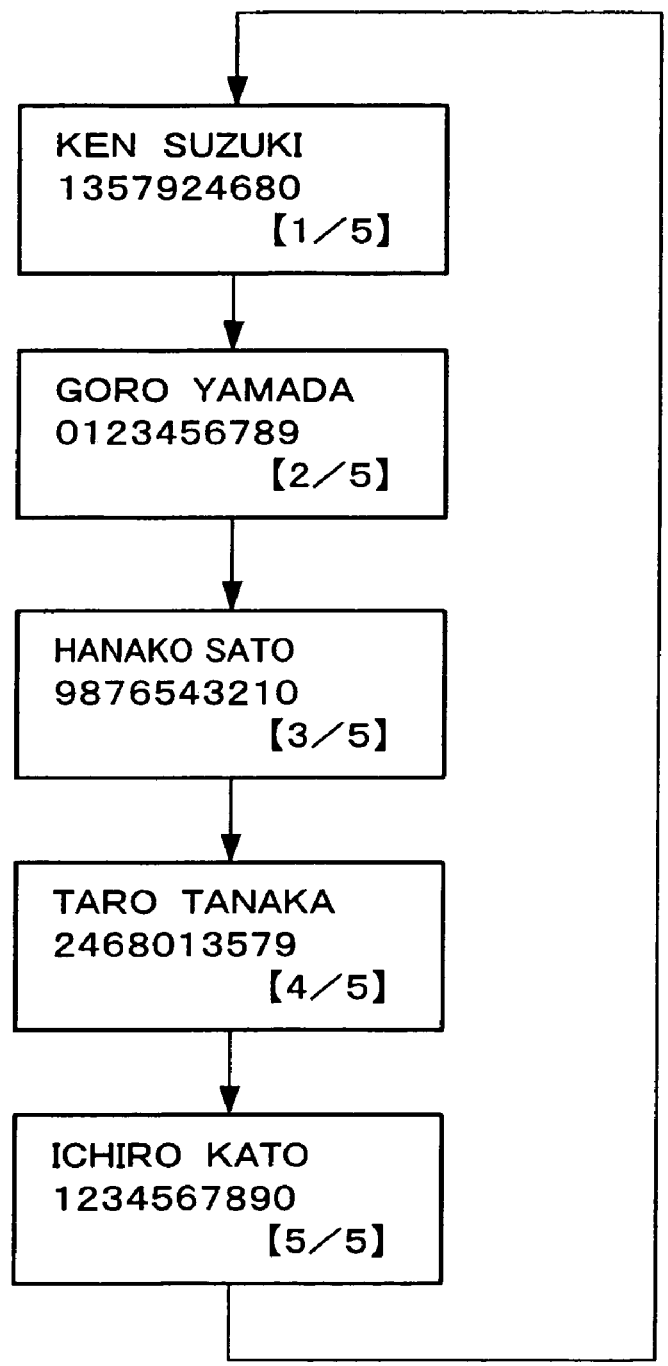

FIGS. 4 and 5 show examples of data contents displayed on the display 5 after the retrieval. Specifically, FIG. 4 is an example of display in the Japanese 50-kana sequence, and FIG. 5 is an example of display in the sequence of greater numbers of call transmitting and arrival times.

In the example of FIG. 4, name "Ichiro Kato", telephone number "1234567890", number of cases extracted by the retrieval and sequential number "1/5" are first displayed. Then, name "Hanako Sato", telephone number "9786543210", number of cases extracted by the retrieval and serial number "2/5" are displayed. Eventually, name "Goro Yamada", telephone number "0123456789", number of cases extracted by the retrieval and serial number "5/5" are displayed as last data. When the user further scrolls, the display of the data with serial number "1/5" is restored.

In the example of FIG. 5, along with number 15 of call transmitting and arrival times as total number of cases extracted by the retrieval, name "Ken Suzuki", telephone number "1357924680", and serial number "1/5" are first displayed. Then, along with number 7 of call transmitting and arrival times as total number of cases extracted by the retrieval, name "Goro Yamada", telephone number "0123456789" and serial number "2/5" are displayed. Eventually, along with number 0 of call transmitting and arrival times, name "Ichiro Kato", telephone number "1234567890" and serial number "5/5" are displayed as last data. When the user further scrolls, the display of the data with serial number "1/5" is restored. The number of past call transmitting and arrival times is stored for each telephone number in the non-volatile memory 9. When a call is transmitted or arrives, the CPU 2 updates the number of call transmitting and arrival times. According to these number of times data, the CPU 2 controls the sequence of display of data on the display 5 to be one with greater numbers of times of utilization. While in the above case the display sequence is controlled to be one with greater numbers of call transmitting and arrival times, it may also be controlled to one with greater numbers of call transmitting or arrival times.

As has been described in the foregoing, according to the present invention the total number of cases of telephone number diary data extracted by the retrieval is displayed together with the corresponding telephone number, and the user thus can recognizes the sequence number of the data being displayed in the total number of cases. In addition, the user can designate the sequence of display to a desired sequence. Furthermore, the user can instantly recognize that time of scrolling that all the cases have or have not been retrieved.

Moreover, according to the present invention it is possible to rearrange data including telephone numbers, etc., with affixed serial numbers in the sequence of greater numbers of times of utilization and affix the serial numbers to the rearranged data for the display thereof.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A retrieved telephone number displaying method for a portable telephone set for retrieving telephone numbers and other data registered in the portable telephone set and displaying the retrieved data in a display of the portable telephone set, wherein the data retrieved are displayed in a predetermined sequence together with a total number of cases of the retrieved data, the total number of cases being a number of times a number represented by an item of the retrieved data called the portable telephone set and was called by the portable telephone set, wherein the data retrieved in the predetermined sequence is data retrieved by a Japanese 50-kana sequence retrieval method, a kana affixing retrieval method, a group retrieval method or a telephone number inputting retrieval method; when a designated sequence of display is a sequence of greater number of times of utilization, the display sequence is also of the greater number of times of utilization.

2. A retrieved telephone number displaying system for a portable telephone set for retrieving telephone numbers and other data registered in the portable telephone set and displaying the retrieved data in a display of the portable telephone set, wherein the data received are displayed in a predetermined sequence together with a total number of cases of the retrieved data, the total number of cases being a number of times a number represented by an item of the retrieved data called the portable telephone set and was called by the portable telephone set, wherein the data retrieved in the predetermined sequence is data retrieved by a Japanese 50-kana sequence retrieval method, a kana affixing retrieval method, a group retrieval method or a telephone number inputting retrieval method; when a designated sequence of display is a sequence of greater number of times of utilization, the display sequence is also of the greater number of times of utilization.

3. A portable telephone set comprising a display for a predetermined sequence, and displays the data retrieved in a predetermined sequence together with a total number of cases of the retrieved data, the total number of cases being a number of times a number represented by an item of the retrieved data called the portable telephone set and was called by the portable telephone set, wherein the data retrieved in the predetermined sequence is data retrieved by a Japanese 50-kana sequence retrieval method, a kana affixing retrieval method, a group retrieval method or a telephone number inputting retrieval method; when a designated sequence of display is a sequence of greater number of times of utilization, the predetermined display sequence is also of the greater number of times of utilization.

4. The method of claim 1, wherein the data retrieved in the predetermined display sequence is arranged in the sequence of greater numbers of times of utilization and displayed in the sequence of the greater number of times of utilization together with the total number of cases of the retrieved data.

5. The system of claim 2, wherein the data retrieved in the predetermined display sequence is arranged in the sequence of the greater numbers of times of utilization and displayed in the sequence of the greater number of times of utilization together with the total number of cases of the retrieved data.

6. The apparatus of claim 3, wherein the data retrieved in the predetermined display sequence is arranged in the sequence of the greater numbers of times of utilization and displayed in the sequence of the greater number of times of utilization together with the total number of cases of the retrieved data.

* * * * *